Patented Jan. 2, 1940

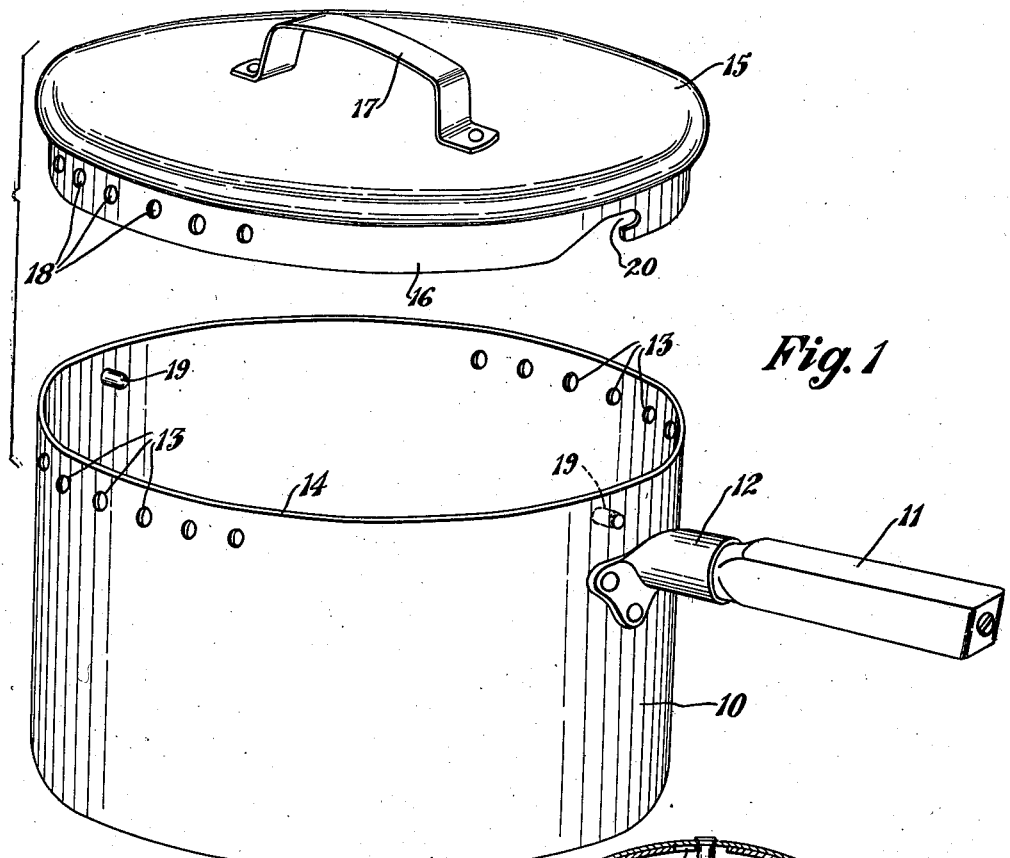
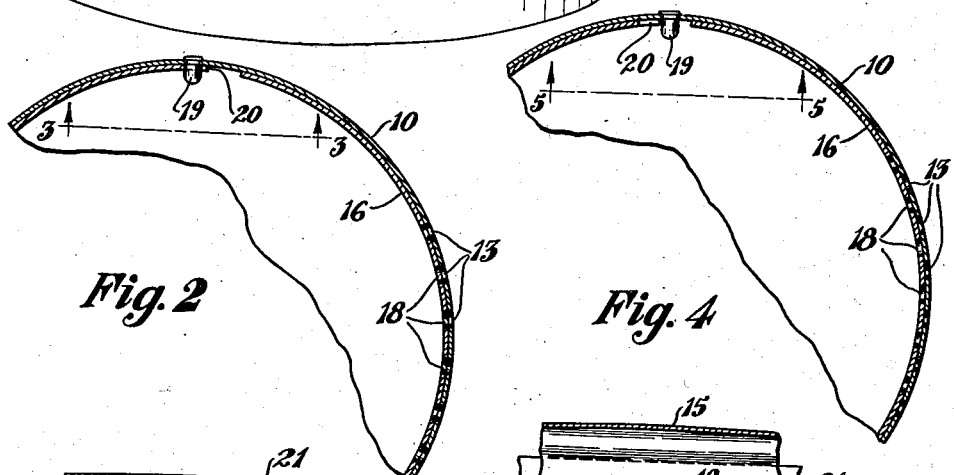
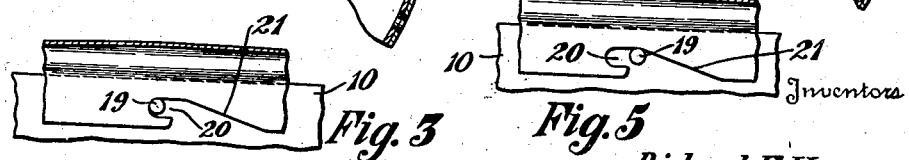
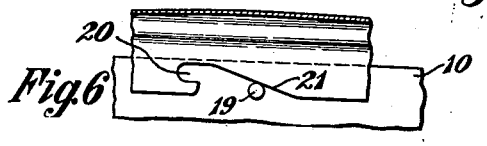

2,185,897

UNITED STATES PATENT OFFICE 2,185,897

LOCK LID STRAINER SAUCEPAN

Richard F. Krause and Gurdon G. Sill, Massillon, Ohio, assignors to The Enterprise Aluminum Company, Massillon, Ohio, a corporation of Ohio Application January 30, 1937, Serial No. 123,238

2 Claims. (Cl. 53—6)

The invention relates to saucepans and similar culinary vessels and more particularly to a saucepan or the like arranged so as to drain the liquid contents therefrom and provided with a lid adapted to be securely locked upon the saucepan when the contents are drained.

An object of the improvement is to provide a saucepan having a lid or cover provided with a rim flange received within the upper open end of the saucepan and cooperating means upon the saucepan and rim flange of the lid providing a bayonet lock to securely hold the lid upon the saucepan.

A further object is the provision of a saucepan and lid of this character in which a series of apertures is provided adjacent to the upper edge of the saucepan and a similar series of apertures is provided in the rim flange of the lid and adapted to register with the apertures in the saucepan when the lid is turned to locked position upon the saucepan.

A further object is to provide a saucepan and lid of this construction so arranged that the lid may be turned upon the saucepan so as to close the apertures therein and prevent the escape of steam while the contents of the saucepan is being cooked.

Another object is to provide a special form of bayonet lock so constructed that the operator cannot accidentally turn the lid in the wrong direction without immediately discovering the same.

The above objects, together with others which will be apparent frm the drawing and following description, or which may be later pointed out, may be attained by constructing the improved lock lid strainer saucepan in the manner illustrated in the accompanying drawing, in which Figure 1 is a perspective view of a saucepan embodying the invention, showing the lid raised from the same;

Fig. 2, a fragmentary section through a part of the upper portion of the saucepan and the rim flange of the lid, showing the same in locked position with the apertures of the lid and saucepan registering with each other;

Fig. 3, a fragmentary section taken as on the line 3—3, Fig. 2, showing the improved bayonet lock;

Fig. 4, a section similar to Fig. 2, showing the bayonet lock in unlocked position and the apertures in the saucepan closed by the solid portions of the rim flange of the lid;

Fig. 5, a section on the line 5—5, Fig. 4, showing the bayonet lock in unlocked position; and Fig. 6, a view similar to Figs. 3 and 5, showing the manner in which the lid will be raised from the saucepan in the event the same is accidentally turned in the wrong direction when attempting to lock the lid upon the saucepan.

Similar numerals refer to similar parts throughout the drawing.

The saucepan indicated generally at 10 is preferably formed of sheet metal and may be any suitable design, preferably substantially cylindrical as shown in the drawing, and may be provided with the usual handle 11 which may be formed of any suitable heat insulated material and connected to the saucepan as by the bracket 12.

A series of discharge apertures 13 may be provided near the upper open edge 14 of the saucepan at each side of the handle 11 for permitting the liquid contents of the saucepan to be discharged therefrom as will be later explained.

The lid or cover 15 is of the form having a depending peripheral rim 16 adapted to snugly fit within the upper open end of the saucepan. A handle 17 of any suitable design may be fixed upon the upper side of the lid for removing or handling the same independently of the saucepan.

The rim flange 16 of the lid may be provided on opposite sides with apertures 18 of the same size and arrangement as the apertures 13 in the saucepan, whereby the apertures in the lid flange may be brought into position to register with the apertures in the saucepan.

Studs 19 may be located at suitable points within the upper portion of the saucepan to cooperate with bayonet slots 20 formed in the rim flange of the cover. The parts are so arranged that when the cover is turned to locked position as shown in Figs. 2 and 3, all of the apertures 18 therein will register with corresponding apertures 13 in the saucepan, whereby the saucepan may be tilted to either side by means of the handle 11 so as to drain the liquid contents therefrom, the cover being tightly locked thereon at this time so as to prevent accidental displacement thereof and loss of the solid contents of the saucepan.

By turning the cover slightly from the locked position shown in Figs. 2 and 3 to the unlocked position shown in Figs. 4 and 5, the apertures 18 in the cover flange are moved entirely out of register with the apertures 13 of the saucepan, the solid portions of the rim flange of the cover closing all of the apertures 13 in the saucepan. The cover may be turned to this position to prevent the escape of steam from the cooking contents of the saucepan.

As shown in the drawing, each of the bayonet slots 20 is provided with an inclined edge 21 arranged to ride upon the corresponding stud 19 when the cover is rotated in a direction away from the locked position. This, as shown in Fig. 6, forces the cover upward from the saucepan and indicates immediately to the operator that the cover is unlocked. Thus, if the operator unintentionally turns the cover in the wrong direction, the mistake will be immediately discovered and accidents avoided in attempting to drain the liquid contents of the saucepan.

We claim:

1. A culinary utensil having a series of apertures near its upper edge, a lid for the utensil having a rim flange for engagement with the utensil and provided with a series of apertures of the same size and arrangement as the apertures in the utensil, and cooperating bayonet slots and studs upon the utensil and lid for locking the lid upon the utensil, the apertures in the utensil and lid being arranged to register with each other when the lid is in locked position, each bayonet slot having a horizontal inner portion and an inclined edge extending from the top of the horizontal portion through the lower edge of the rim flange and adapted to engage the corresponding stud so as to raise the lid entirely from the utensil when the lid is turned in a direction to unlock the same.

2. A culinary utensil having a series of apertures near its upper edge, a lid for the utensil having a rim flange for engagement with the utensil and provided with a series of apertures of the same size and arrangement as the apertures in the utensil, studs upon the utensil and cooperating beyonet slots in the lid for locking the lid upon the utensil, the apertures in the utensil and lid being arranged to register with each other when the lid is in locked position, each bayonet slot having a horizontal inner portion and an inclined edge extending from the top of the horizontal portion through the lower edge of the rim flange and adapted to engage the corresponding stud so as to raise the lid entirely from the utensil when the lid is turned in a direction to unlock the same.

RICHARD F. KRAUSE.
GURDON G. SILL.